United States Patent [19]

Nurse et al.

[11] Patent Number: 5,097,418
[45] Date of Patent: Mar. 17, 1992

[54] METHOD AND MEANS FOR MANAGING CITATIONS IN DOCUMENTS

[75] Inventors: Howard L. Nurse, Palo Alto; Herbert G. Drake, Jr., San Rafael, both of Calif.

[73] Assignee: Commsoft, Inc., Windsor, Calif.

[21] Appl. No.: 340,137

[22] Filed: Apr. 14, 1989

[51] Int. Cl.⁵ .................... G06F 15/40; G06F 9/00
[52] U.S. Cl. .................................................. 364/419
[58] Field of Search ... 364/200 MS File, 900 MS File, 364/419

[56] References Cited

U.S. PATENT DOCUMENTS 4,503,515  3/1985  Cuan et al. ................... 364/900
4,648,067  3/1987  Repass et al. ................. 364/900
4,648,071  3/1987  Repass et al. ................. 364/900

Primary Examiner—Allen R. MacDonald
Assistant Examiner—Debra A. Chun
Attorney, Agent, or Firm—A. C. Smith

[57] ABSTRACT

One of several processes is performed for the automatic management of footnote references in printed documents and a computer-controlled display shows bibliographically correct information in long form and short form in a processing system that provides for information to be enterd, stored, analyzed, merged, and transmitted to a printing device for the creation of a printed report that contains footnotes, endnotes or embedded notes which reference a source of information in correctly-reported style.

3 Claims, 5 Drawing Sheets

RECORD: ___38___  
TITLE: ___40___ 39 LAST EDITED ON: ___52___  
REFERENCE: ___41___  
LIBRARY CALL NUMBER: ___42___  
ABBREVIATION: ___43___  
PUBLISHER INFO: ___44___  
SERIES: ___45___  
AUTHOR: ___46___  
REPOSITORY: _____ 53

FIGURE 2

METHOD AND MEANS FOR MANAGING CITATIONS IN DOCUMENTS

BACKGROUND OF THE INVENTION

This invention relates to the automatic management of citations for written documents which use and refer to primary and secondary sources, and more particularly to a data management and printing system and method for choosing and presenting first-and second-use forms of such citations.

Written documents which refer to other published sources commonly credit those sources, for example, to conform with copyright laws. Various style guides exist which indicate how references to previously published material should appear. Examples of style guides include the MLA Handbook, Chicago Manual of Style, and Webster's Standard American Style Manual. Style guides recommend formats for first and second uses of a primary or secondary source citation. The recommended second use format varies depending on whether the citation appears in consecutive references, where 'Ibid' can be used, or appears with an intervening citation, where a short or abbreviated form is used.

In a user-controlled interactive computer word processing or data management system, it is desirable to dissociate the user from the computer and its internal operations in order to provide a system and method that relates directly to the work at hand and that allows the user to learn quickly how to operate the processing system to work efficiently toward the completion of his or her task. This is especially important in processing systems for users who have minimal computer experience.

Processing systems and methods exist which allow for the incorporation of information from sources into computer storage, including complete source citations. These same systems and methods provide for the preparation of a printed report from the stored information, and for the printing of the citation information in the form of footnotes, embedded notes and endnotes. While these prior processing systems are capable of presenting footnotes, embedded notes, or endnotes in the first or second use formats, they usually can only present the citation exactly as it was entered in the form that is pre-determined by the operator during the data entry process. Examples of word processing systems which provide for the entry and presentation of source citations include WordPerfect by Word Perfect Corporation; Wordbench by Addison-Wesley Publishing Company; and, Nota Bene by Dragonfly Software.

Accordingly, it is the object of this invention to provide an improved method and means for processing source citation information that overcomes the disadvantages of prior art. In particular, it is an object of this invention to provide a way to parse the source citation into the correct first usage (long), and second use (short, or Ibid.) formats and then determine the optimum footnote format automatically, regardless of the sequence in which the information is cited.

SUMMARY OF THE INVENTION

In accordance with the present invention, a computer processing system and method has particular application to the citation of sources in written documents. A computer is programmed in conventional manner to display an area on the screen where the bibliographically correct information about a source can be entered in its long and short forms. The source citation is linked to the written text to which it applies. By using a menu selection in the present embodiment, the user can instantly modify, edit, or alter the first and second use forms of the citation. The source citation can be used as often as necessary in the written document to provide proper documentation. When the final written document is printed, all references to the source citation will be presented in the correct format, either long, short, or Ibid., depending upon prior use of the citation. If the document is reorganized and reprinted, the citations will continue to be printed using the correct format. The system and method of the present invention thus allows for the use of an automatic process that can present information in the different sequences which might be appropriate for different types of printed reports. Also, for ordinary word processing applications, the present invention has the advantage of allowing a document to be extensively edited, including substantial resequencing of text, without the need to review all footnote/endnote insertions for the use of the correct form. In addition, for such ordinary word processing applications, the present invention automates the citing of information sources by freeing the operator from the need to remember when a source has already been cited and, if it has been referred to more than once, what standard short form text to use.

DESCRIPTION OF THE DRAWINGS

FIG. 2 is a graphic representation of a frame which displays information about a citation in its first and second use.

DESCRIPTION OF THE PREFERRED EMBODIMENT

For clarity of description, one embodiment of the present invention is described herein which produces source citations for printed reports from a database program. Of course it should be understood that changes to the data entry field(s) such as, but not limited to, their identification label, type (text, numeric only, multiple choice, date only, etc.), size or length, position relative to one another within their area, and quantity can make the invention appropriate for entirely different database or word processing applications where multiple references are made to a common data element and the form that the data element will take in a report will depend on prior use of that same data element.

The following definitions are applicable to the description of the present invention:

Source Citation

Complete documentation of the source of information referred to or quoted in a written work. Source citations usually appear in one of three forms:

1. Endnotes, which are similar to footnotes, but which appear all together at the end of a book or article;

2. Footnotes, which can be placed either at the foot of a page or at the back of the book;

3. Embedded notes, which appear in the text immediately after the information to which they refer.

Short form, or second use citation

An abbreviated form of endnote, footnote, or embedded note, which is used as a substitute for the full, formal citation when the citation has previously been given in full. The short form citation, for example, often includes, at a minimum, the author s last name and an abbreviation of the title.

Format A, B, or C

Arbitrary arrangement of text. For example, a history could be written from the present day going back in time (Format "A"), or from an early time to the present day (Format "B"), or according to different perspectives, such as military history, economic history, religious history, etc. (Format "C"). Each of these arrangements of text will result in a different order of presentation of the same information and source citations.

Figure 1:
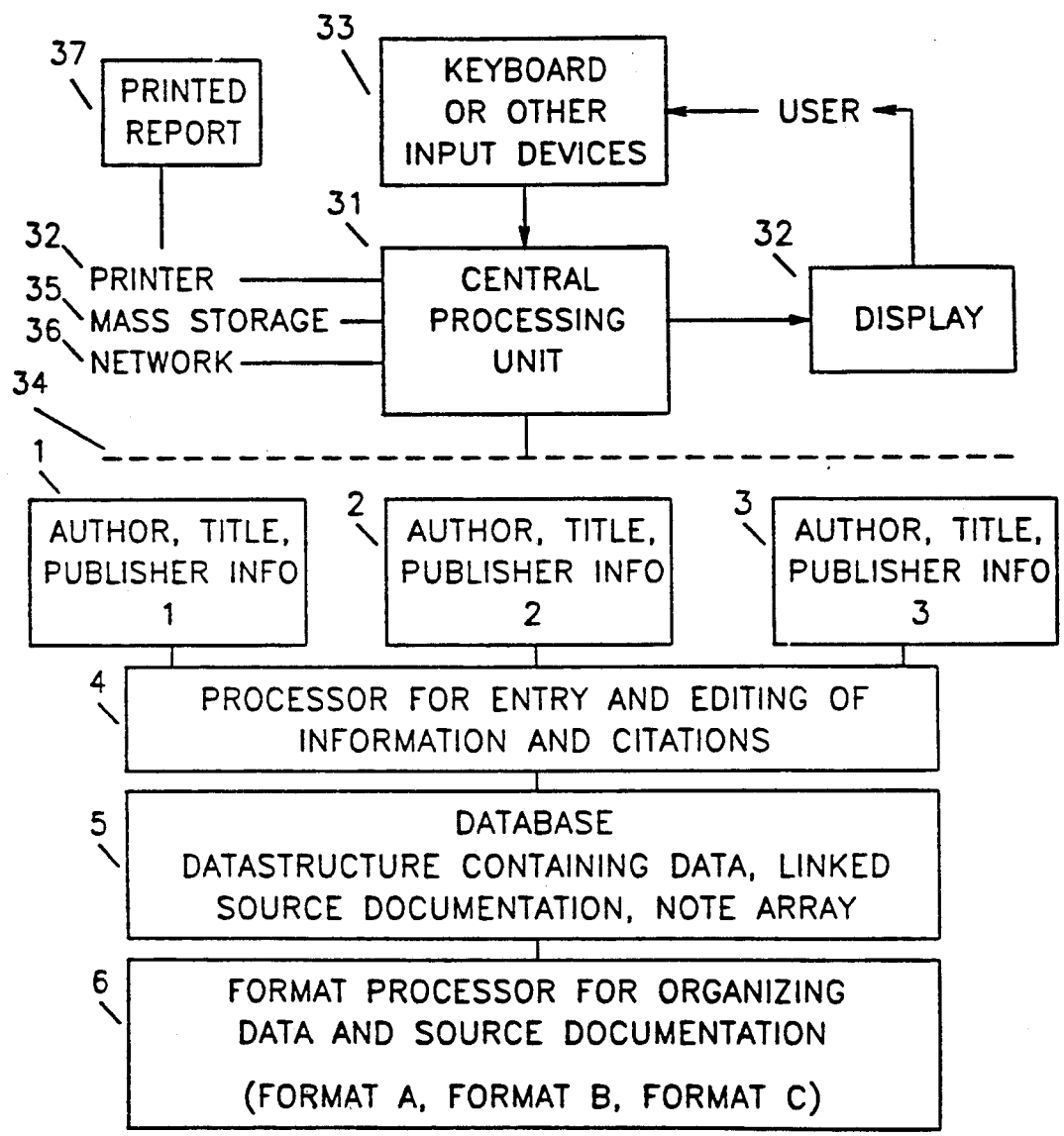
FIG. 1 is a block schematic diagram of the preferred embodiment of the present invention.

Referring now to FIG. 1, there is shown a schematic diagram of the preferred embodiment of the present invention that includes a central processing unit 31 which is connected to and controls the display device 32 in response to inputs supplied to the CPU via the user's manipulation of the keyboard (or mouse or other input device) 33. The CPU 31 accesses addressed memory 34 which contains information that is supplied via the keyboard 33, mass storage 35, or network 36 and instructions for manipulation of that information in accordance with the operating sequences of the present invention. These sequences are directed toward developing a specific database 5 of information and linked source citation information under command of the processor 6 (described in detail later herein). The processor 6 interacts with the CPU 31 so that information and citations can be organized and formatted under control of the user. Furthermore, the processor 6 interacts with the CPU 31 to provide a printed report 37 from printer 32.

Referring to FIG. 1, the user can accumulate information from several sources 1, 2, and 3, which may be published works, public or private records, interviews with witnesses, or a variety of other information sources. Only three sources are shown in the diagram, but the actual number is indefinite. Information is entered with an Editing Process 4, which encodes the information into a suitable format and places it into a storage area of Database 5, including the recording of the source of that information. The user makes the following key entries regarding the source:

1. The full, formal source citation. In the case of published works, this normally includes the name of the author, the title of the work, publication information, and the location of the book, along with any appropriate call numbers.

2. A shortened description of the work which is suitable for discriminating this work from any others that the user has included in his research activity. This is often the author's name and/or a shortened version of the title.

3. Detailed information appropriate to each piece of discrete information taken from the given work. This usually includes the volume and/or page number, but may include other items that will help a reader of the final printed report to locate and confirm the information that has been entered.

Once the information and source citations have been entered into the database 5, the user proceeds to invoke one or more of several format processes 6, which have been designated Formats A, B, and C in the diagram. There is generally more than one such format and these different formats place the information obtained from the information sources, 1, 2, and 3, in a different order. Therefore, there is no way that the user will necessarily know in advance the sequence that the information obtained from these sources will be presented in the printed report 37. Of course, the processor 4 and processor 6 may constitute time-shared operation of the central processing unit 31.

The present invention automatically prepares the footnote, embedded note, or endnote documentation in a currently accepted style. Specifically, this style requires that a full description of the source, appended by any detail information such as page numbers, be provided by the footnote/endnote that first cites information from a given information source. Subsequent information taken from the same source is properly cited in footnote/endnote in the shortened, "second use" form, which is then appended by detailed information. Further, the present invention automatically provides the proper use of the word "Ibid.", followed by detailed volume and/or page information, under specified conditions such as generally when a footnote/endnote item follows another taken from exactly the same single source.

The present invention thus uses an array of data structures for which one element of the array is allocated for each footnote or endnote. Two steps are involved. First, load the array of data structures, which takes place during the preparation of the normal printed report as it is processed; and, secondly, prepare the notes, which are appended to the end of the current page, embedded in the text, or added to the end of the report, depending on which style has been chosen.

Referring now to FIG. 2, there is shown a frame of the data entry screen 53 for a source citation of the preferred embodiment. The source citation entry screen 53 contains data entry fields for record number 38, title of the work 39, a user's reference 40, the source s library call number 41, and abbreviation for the work 42, publisher information 43, series 44, author of the work 45, repository of the work 46, and the date the record was last edited 52. Data from the title 39, library call number 41, publisher information 43, series 44, author 45, and repository 46 will be contained in the first use format, while data contained in the abbreviation field 42 will be used in the second use format. Once information and linked source citations have been entered into the database 5, reports 37 can be printed. As the printed report 37 is prepared by either format process A, B, or C, an element 48 is added to an array 47 in database 5 each time information is taken from database 5 that contains a citation to one of the designated sources 1, 2, or 3. That element contains all the information previously listed above; namely:

Long form (first use form) 49;

Short form (second use form) 50; and

Detailed information (volume, page, etc.) 51.

Figure 3:
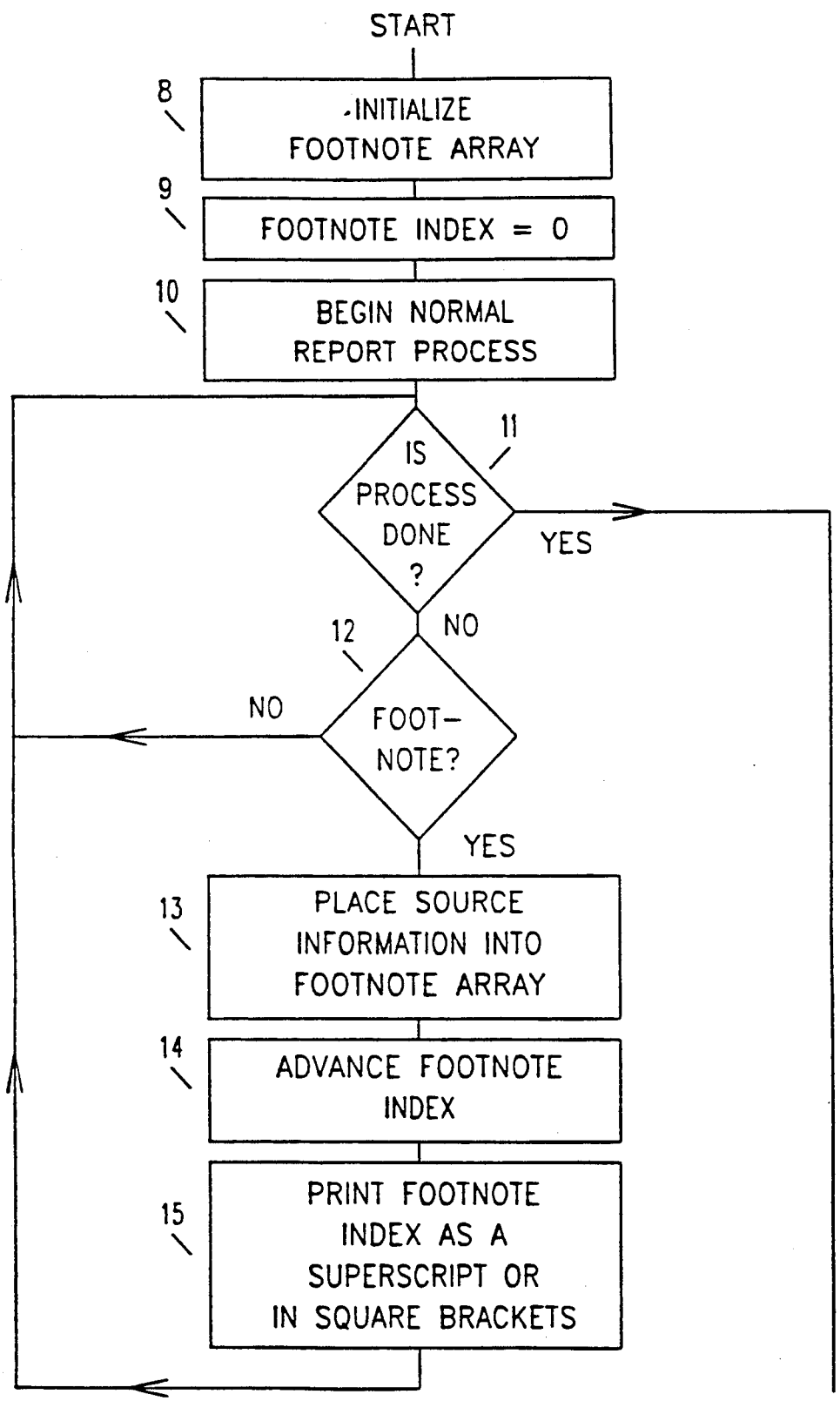
FIG. 3 is a logic flow diagram illustrating how an array of data is processed to establish citations which are used.

FIG. 3 shows how the array of data structures is built. The footnote array of data structures 47 is first initialized by process 8 and a "Footnote Index" into that array is set to zero 9, thus addressing the first element of the array 47. Format processing A, B, or C, shown as 6 in FIG. 1, is then initiated 10. The footnote/endnote feature monitors this process through gates 11 and 12, which test for report completion 11 and for the use of information requiring a footnote/endnote 12. When a footnote or endnote is required, the footnote information is placed into the array of footnote data structures 47 at the position determined by the footnote index 13 as illustrated in FIG. 5. The index is then incremented 14 by one and is then inserted into the report as a superscript footnote reference (or in square brackets) 15. This results in the first footnote array element (zero) being cited as superscript "1", the second element (one) being cited as "2", and so forth. The array of footnote data structures is reported as illustrated in FIG. 5. As described above, endnotes are accomplished by printing a complete report using the process illustrated in FIG. 3, and then appending endnotes with the second process illustrated in FIG. 4. This process starts with element zero and ends with the last element, as determined by the value of the footnote index when the first process is completed. Footnotes are very similar: process 1 is accomplished for one page; process 2 then inserts the footnotes at the bottom of the page and process 1 is repeated for the report contents of the subsequent pages. This process is repeated until all pages have been printed. Again, the footnote index is used to determine the starting and ending footnote for a page, a register being used to store the footnote index last printed so that the first footnote on any page is the one immediately following the last footnote printed on the previous page.

Figure 4:
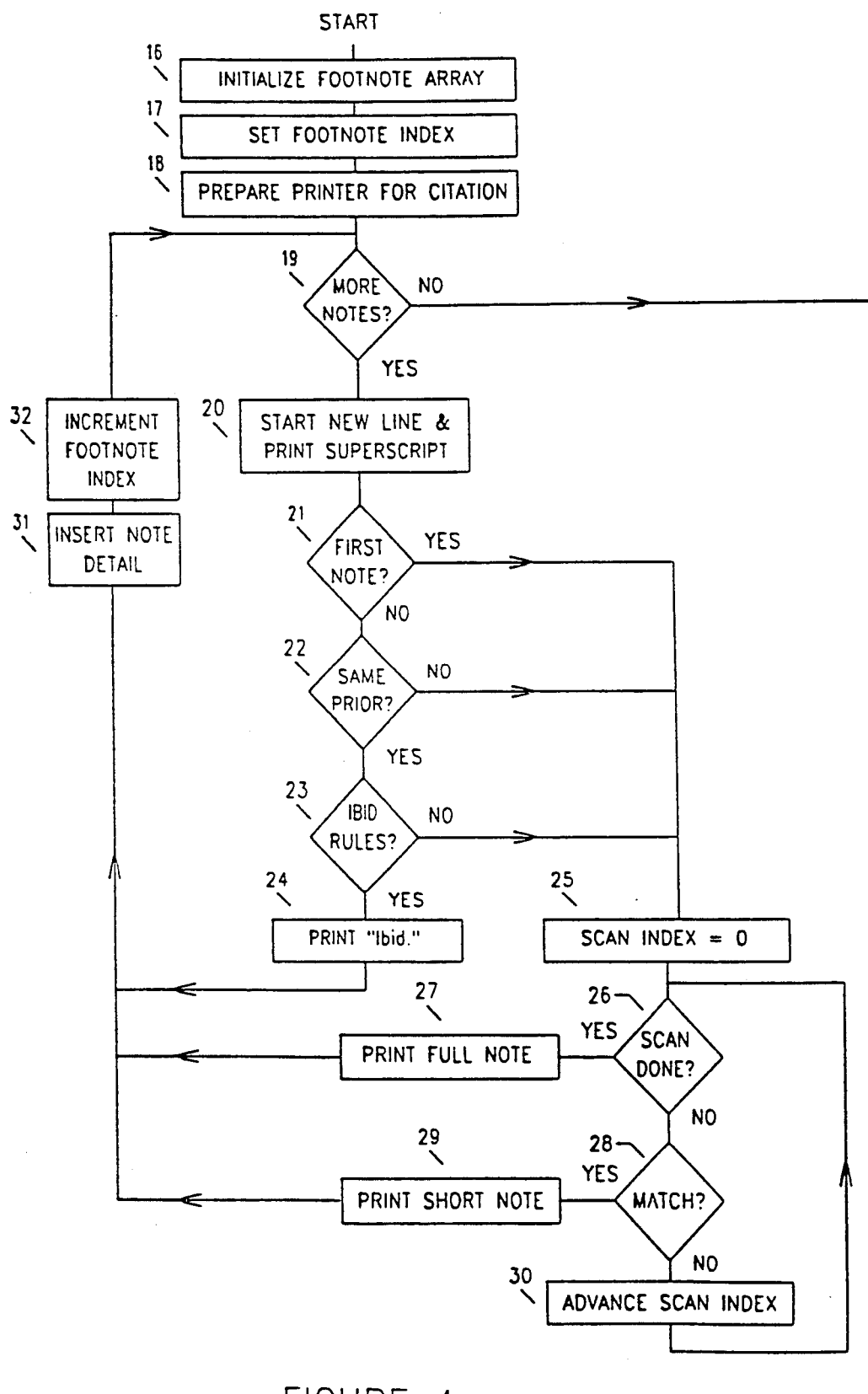
FIG. 4 is a logic flow diagram illustrating how the array of data is used to establish the correct form of the citation as it will appear when printed on a written document.
Figure 5:
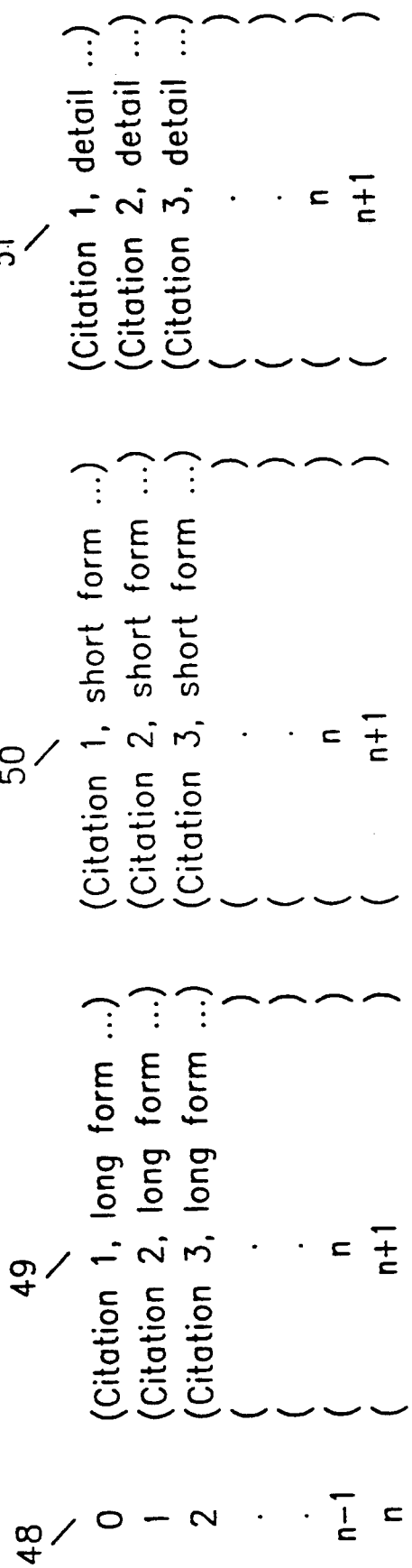
FIG. 5 is a symbolic description of the citation array data structure.

For endnotes and for the first page in the case of footnotes, initializing the footnote array 16 and setting the footnote index 17, as illustrated in FIG. 4, are similar to initializing the footnote array 8 and setting the footnote index 9, as illustrated in FIG. 3. For subsequent footnote pages, however, these procedures set the footnote index to the footnote immediately following the last footnote printed. The printer is then prepared for the citation 18. For endnotes, this procedure starts a new page and prints a suitable header (e.g., "REFERENCES"). For footnotes, the procedure advances the printer to the bottom of the page and then types any appropriate format marks or performs any appropriate type face changes. It should be noted that fully correct footnoting actually requires that a pro-forma version of the first process, for example, as illustrated in FIG. 3 be performed each time a footnote is indicated in the first process, since long footnotes can result in a page change earlier than would otherwise take place.

The remaining procedure involves a printing loop that prints all notes. Gate 19 terminates this loop when the last note has been printed. At Step 20, the appropriate superscript or bracketed note number are printed and the printing of the actual note is prepared. Gates 21, 22, and 23 determine when an "Ibid." format applies; that is, if not the first note (gate 21), the data structure in the footnote array at the position immediately prior the present setting of the footnote index is compared with the data structure at the position of the footnote index in gate 22. If a match is detected, the logic in gate 23 verifies whether the new and prior citation qualify under the "ibid rules" (i.e., they both cite a single source and that each source citation begins the respective note). Notes passing these three tests (gates 21, 22, and 23) are printed as "Ibid.". Notes failing gates 21, 22, or 23, are then processed with a scan of the footnote array of data structures to determine whether a given citation has already been printed. This scan begins at the start of the footnote array 25 and continues until the scan has reached the element immediately prior to the current note value, as contained in the footnote index via gate 26. If a match is found between the current note and any note previously printed, the scan loop terminates via gate 28, and the short form of the citation will be printed. Otherwise, the scan loop continues, and the scan index is incremented 30 until the note last printed is tested, and the scan loop will then be terminated by gate 26, and will print the long form. The first note is always printed in the long form, as gates 21 and 26 will pass control immediately to the long form procedure. Regardless of whether the ibid., short, or long form is printed, the main loop always is routed through Step 31 which appends to the note any detailed information that might be present in the footnote array data structure pointed to by the footnote index. The formatting of the ibid., short, and long forms is normally the following:

Long form: Complete description of work in proper sequence, followed by detailed volume and/or page information.

Short form: Abbreviated description of work, followed by detailed volume and/or page information.

Ibid form: The word "Ibid.", followed by detailed volume and/or page information.

The footnote index is then incremented 32 to process the next note and then gate 19 tests whether the routine has processed all existing notes.

What is claimed is:

1. In a keyboard display system for (1) preparing and storing source citation footnote text, including long and short and ibid forms thereof, and textual data, and (2) merging said source citation and textual data to form a footnoted document, the method comprising the steps of:
   storing textual data, including a reference to a selected source citation for subsequent access;
   forming a list of source citations including their long and short forms;
   accessing the stored textual data including the source citation reference for display;
   accessing from the list of source citations for interposing with displayed textual data the long form of the citation in response to a first occurrence of reference in the accessed textual data to said selected source citation;
   accessing from the list of source citations for interposing with displayed textual data a short form of the source citation in response to a second or subsequent occurrence of reference in the accessed textual data to said selected source citation; and
   interposing an 'ibid' form of the source citation with displayed textual data in response to the second or subsequent occurrence of reference in the accessed textual data to said selected source citation when the immediately preceding footnote refers to the same source citation.

2. The method according to claim 1 wherein the steps of storing textual data and forming a data base include establishing linking data for correlating the data elements in the data base for selectively accessing said long and short form source citations without altering the data elements in the stored textual data.

3. The method according to claim 1 for displaying the long and short form source citations in textual data, wherein in the step of storing, the textual data is stored with a plurality of independent data elements, each designating the long or short form of a source citation; and in the step of forming, the data base is formed including at least the long and short forms for each source citation for display in selected sequence relative to the recurrence of reference in the accessed textual data to the data elements associated with each such selected citation.

* * * * *